United States Patent [19]

Nakamura et al.

[11] Patent Number: 5,202,071
[45] Date of Patent: Apr. 13, 1993

[54] METHOD OF PRODUCING FIBER REINFORCED PLASTIC MOLDINGS

[75] Inventors: Kazuyuki Nakamura; Shigeki Inoue; Tadamoto Sakai, all of Hiroshima, Japan

[73] Assignee: The Japan Steel Works, Ltd., Tokyo, Japan

[21] Appl. No.: 714,524

[22] Filed: Jun. 13, 1991

[30] Foreign Application Priority Data

Jun. 20, 1990 [JP] Japan ................... 2-159655

[51] Int. Cl.⁵ .................... B29C 43/02; B29C 47/06
[52] U.S. Cl. ........................ 264/137; 264/157; 264/171; 264/324
[58] Field of Search ............ 264/177.1, 177.17, 175, 264/236, 137, 174, 378.14, 257, 138, 157, 320, 324, 169, 171; 427/365, 366, 389.8; 156/244.11, 244.18

[56] References Cited

U.S. PATENT DOCUMENTS

| | | | |
|---|---|---|---|
| 3,802,670 | 4/1974 | Okada et al. | 425/208 |
| 3,876,736 | 4/1975 | Takiura | 425/378.1 |
| 3,975,483 | 8/1976 | Rudloff | 264/137 |
| 4,309,379 | 1/1982 | Daniels et al. | 264/328.14 |
| 4,427,482 | 1/1984 | Yamada et al. | 264/137 |
| 4,890,996 | 1/1990 | Shimizu | 425/208 |
| 4,913,641 | 4/1990 | Zahradnik | 425/208 |
| 4,990,293 | 2/1991 | Macosko et al. | 264/171 |
| 5,089,075 | 2/1992 | Sonoda | 156/244.18 |

OTHER PUBLICATIONS

*Plastics*, vol. 30, No. 7, p. 70, 1979 (Japanese Language article without English translation).
*Plastics*, vol. 36, No. 8, p. 72, 1985 (Japanese Language article without English translation).
*Jeti*, 1989, vol. 35, pp. 192–197 (Japanese Language article without English translation).

*Primary Examiner*—Willard Hoag
*Attorney, Agent, or Firm*—Sughrue, Mion, Zinn, Macpeak & Seas

[57] ABSTRACT

A method of producing fiber reinforced plastic moldings. The method includes the steps of: supplying a thermosetting resin component and a thermoplastic resin component into a twin screw extruder; kneading the thermosetting resin component and the thermoplastic resin component into each other in the extruder to produce a fused material in which fine particles of the thermoplastic resin component are micro-dispersed in a matrix of the thermosetting resin component; suppling a liquid monomer into the extruder so that the liquid monomer is mixed with the fused material so as to adjust the viscosity of the fused material to be low; suppling a reaction initiator into the extruder so that the reactive initiator is mixed with the fused material at a temperature not higher than a reaction initiation temperature so as to produce a reactive kneaded material; continuously discharging the reactive kneaded material from a die of the extruder so as to apply the reactive kneaded material onto a long fiber mat; simultaneously pressing and cooling the mat coated with the reactive kneaded material to shape the mat into a sheet; cutting the sheet into pieces having a predetermined length; shaping and curing the thus cut pieces into moldings of a desired form by means of a press molding machine.

6 Claims, 4 Drawing Sheets

METHOD OF PRODUCING FIBER REINFORCED PLASTIC MOLDINGS

BACKGROUND OF THE INVENTION

FIELD OF THE INVENTION

The present invention relates to a method of producing fiber reinforced plastic moldings in which a long-fiber mat is used as a reinforcing material.

BACKGROUND

The following are conventional methods of producing fiber reinforced plastic moldings.

A first method is described in "PLASTICS", Vol. 30, No.7, P. 70, 1979. In this method, as shown in FIG. 5, unsaturated polyester resin is dissolved and mixed in a volatile styrene monomer in each of two resin tanks 23a and 23b to thereby prepare resin paste 26 in advance. The resin paste 26 in resin tank 23a is supplied by means of a pair of doctor knives 27a and 27b into a polyethylene film 24a supported on and conveyed by a conveyer belt 25. Glass fibers 21a, cut by a roving cutter 22, are spread over the resin paste supplied on the polyethylene film 24. Another polyethylene film 24b is coated by means of another pair of doctor knives 28a and 28b with the resin paste 26 supplied from the other resin tank 23b. The film 24b is reversed by a guide roll 30 and positioned on the polyethylene film 24a. Thereafter, the polyethylene films 24a and 24b are pressed by a plurality of defoaming and impregnating roll pairs 29a, 29b, 29c, and 29d provided on the downstream side so as to be shaped into a polyethylene sheet. The sheet is then rolled as a sheet molding compound (hereinafter abbreviated to "SMC").

A second method is described in "PLASTICS", Vol. 36, No. 8, P. 72, 1985. In this method, as shown in FIG. 6, glass roving 31 is cut by a cutter 32 provided on an upper portion of a hopper 33 so as to be formed into chopped glass 31a which is supplied into the hopper 33. A liquid resin compound 38 is applied to the chopped glass 31a as the chopped glass descends from the outlet of the hopper 33 so that the chopped glass 31a is impregnated with the liquid resin compound 38 by means of a pair of impregnating rolls 35 to thereby prepare a TMC compound 36. The TMC compound 36 is supplied onto a polyethylene film 34a conveyed by a conveyer belt 37, and a polyethylene film 34b is positioned on the polyethylene film 34a. Then, the films 34a and 36b are pressed to adhere with each other by means of compaction rollers 39 so as to form a sheet to thereby prepare an SMC. A third resin transfer molding method is described in "JETI", Vol. 37, No. 6, P. 150, 1989. In this method, a long-fiber mat of glass fiber is set in a metal mold, and after the mold is closed, liquid thermosetting resin is poured into the metal mold so that the long fiber mat is impregnated with the liquid thermosetting resin. Then, the mat, impregnated with the liquid thermosetting resin, is heated and pressed so as to undergo a hardening reaction to thereby form a molding.

A fourth method is described in "PLASTIC AGE", Apr., P. 194, 1989. In this method, as shown in FIG. 7, two long-fiber glass mats 51a and 51b, disposed on thermoplastic resin sheets 54a and 54b, respectively, are continuously conveyed by means of a pressure belt 55. A polypropylene (PP) fused sheet 53 is extruded by means of an extruder 52 such that the PP sheet is sandwiched between the two glass mats 51a and 51b. Then, the stack is successively passed through a melting, impregnating and laminating zone 55a and a cooling zone 55b of the press belt 55 so as to be subjected to pressurization and impregnation under high pressure.

In the first and second method described above, however, there have been problems in that since liquid resin is kneaded in batch-type tanks, resin is limited to that having low viscosity and good compatibility and the cycle time of production is so long that the productivity is poor. Additionally, since short fibers are used as a reinforcing material, the produced moldings have poor rigidity in comparison with those using long fibers as a reinforcing material.

The problem with the third method is that the cycle time is long because, after a long fiber mat has been set in a metal mold, the mold is closed and then accurately-metered liquid resin must be poured into the metal mold. Further, the type of resin that may be used is limited to that having good compatibility.

The fourth method has experience problems in that since PP resin having high viscosity is used, it is necessary to perform pressurization under high pressure in the impregnation step. Additionally, if the number of long fiber mats is increased, impregnation cannot be sufficiently performed.

SUMMARY OF THE INVENTION

It is therefore an object of the present invention to solve the foregoing problems in the prior art.

It is another object of the present invention to provide a method of producing fiber reinforced plastic moldings, in which a long-fiber mat applicable to any resin, whether it is compatible or non-compatible, is used as a reinforcing material.

In Order to attain the above objects, according to the present invention, the method of producing fiber reinforced plastic moldings comprises the steps of: supplying a thermosetting resin component and a thermoplastic resin component into a twin screw extruder; kneading the thermosetting resin component and the thermoplastic resin component with each other in the extruder so as to produce a fused material in which fine particles of the thermoplastic resin component are micro-dispersed in a matrix of the thermosetting resin component; suppling a liquid monomer into the extruder so that the liquid monomer is mixed with the fused material so as to adjust the viscosity of the fused material to be low; pouring a reaction initiator into the extruder so that the reactive initiator is mixed with the fused material at a temperature not higher than a reaction initiation temperature so as to produce a reactive kneaded material; continuously discharging the reactive kneaded material from a die of the extruder so as to supply the reactive kneaded material onto a long fiber mat; simultaneously pressing and cooling the mat coated with the reactive kneaded material to shape the mat into a sheet; cutting the sheet of mat into pieces having a predetermined length; shaping the thus cut pieces into moldings of a desired form by means of a press molding machine; and curing the moldings at a high temperature.

Thermosetting and thermoplastic resin components supplied into the twin screw extruder are sent to the die while being kneaded with each other so as to be fused by the shearing force of the screw so that the thermoplastic resin is micro-dispersed in the matrix of the thermosetting resin component. The fused material is mixed with a liquid monomer supplied thereto so as to make the viscosity thereof low, and thereafter mixed with a subsequently supplied reaction initiator at a temperature not higher than the reaction temperature so as to be a low-viscosity reactive kneaded material of a temperature not higher than the reaction initiation temperature, and the reactive kneaded material is continuously discharged from the die. The discharged reactive kneaded material is poured onto a continuously-conveyed long fiber mat, and the long fiber mat, coated with the reactive kneaded material, is shaped into a sheet by the pressing and cooling means provided at the downstream side in the conveying direction. At the same time, the long fiber mat is cooled so as to produce a low-reactive compound sheet in the sufficiently impregnated state. Then, the low-reactive compound sheet is cut at a predetermined length, and shaped into a desired form by means of a press molding machine, and cured at a high temperature, so that fiber reinforced plastic moldings are obtained.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

Referring to the accompanying drawings, an embodiment of the present invention will be described hereunder.

Figure 1:
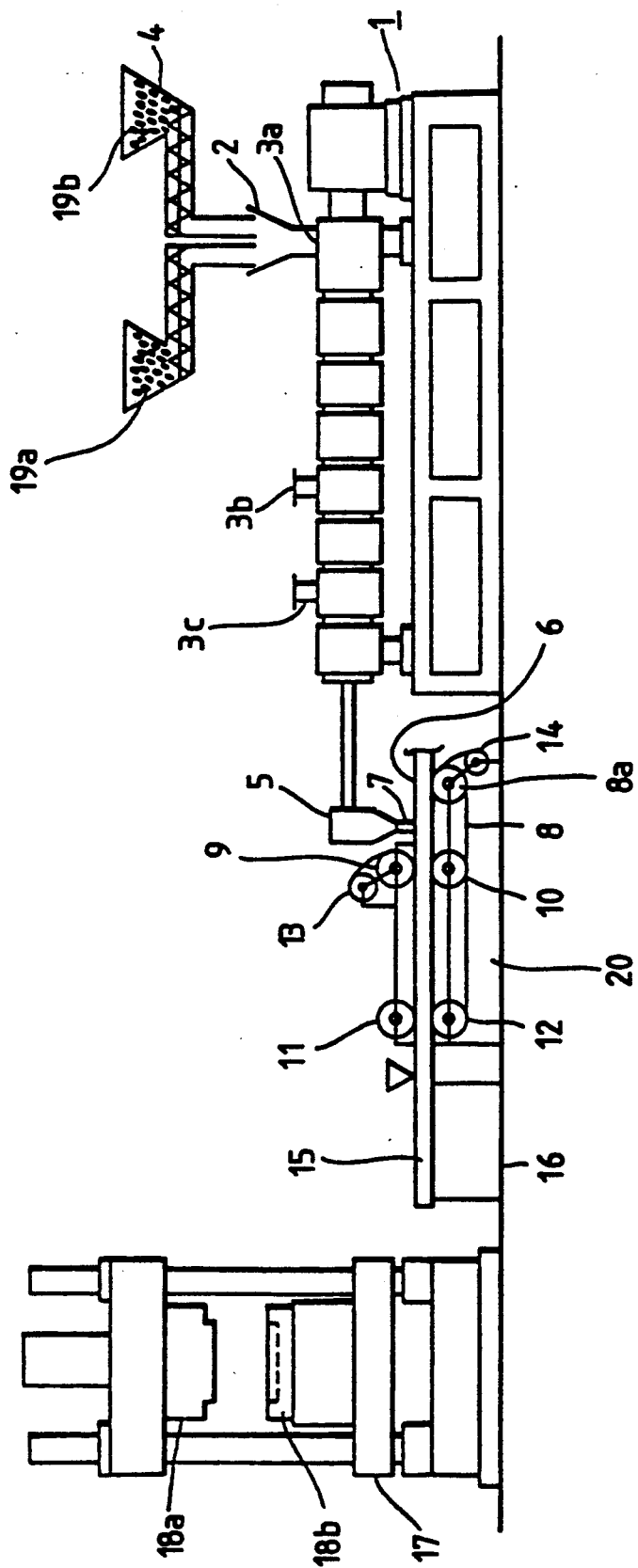
FIG. 1 is a side view of an apparatus for producing fiber reinforced plastic moldings according to one embodiment of the present invention.

Referring to FIG. 1, a thermosetting resin component 19a and a thermoplastic resin component 19b are supplied in a predetermined ratio into a hopper 2 of a twin screw extruder 1 through respective auxiliary supply devices 4. The thermosetting and thermoplastic resin components 19a and 19b are supplied through a first supply inlet 3a from the hopper 2 and conveyed to a die 5 by means of a twin screw. In the process of being conveyed to the die 5, the resin components are kneaded with each other and are subjected to shearing forces created by the screw so that they are fused into a fused material in which the thermoplastic resin component 19b is micro-dispersed in the matrix of the thermosetting resin component 19a. A monomer is supplied from a second supply inlet 3b into the twin screw extruder 1 by a liquid plunger pump (not shown) or the like. The monomer is mixed into the fused material so that the viscosity of the fused material is reduced at a relatively low temperature. Thereafter, a reaction initiator, dissolved in a monomer, is poured from a third supply inlet 3c by a liquid plunger pump (not shown) or the like and kneaded into the fused material at a temperature not higher than the reaction initiation temperature so that the reaction initiator is uniformly mixed into the fused material having low viscosity, resulting in a low-viscosity reactive kneaded material 7 containing the reaction initiator. The thus kneaded material 7 is continuously discharged from the die 5 of the twin screw extruder 1.

A long-fiber mat 6, made of glass fiber or the like, is continuously supplied from a storage portion (not shown). A belt 8 is stretched by guide rolls 8a and two rollers 10 and 12 which are rotatably supported on a table 20 at suitable intervals. The long-fiber mat 6 is supported on the belt 8 having a thin adhesion preventing plastic film 14 disposed therebetween so that the mat is continuously conveyed by the belt 8. The mat 6 is coated with the reactive kneaded material 7 discharged from the die 5. Thereafter, the mat 6 is covered with a thin adhesion preventing plastic film 13 and is pressed by two rolls 9 and 11 disposed in opposition to the rolls 10 and 12 respectively so that the pressed mat coated with the material 7 is shaped into a sheet and conveyed forward (in the left hand direction in the drawing). At this time, the rolls 9, 10, 11, and 12 are cooled by water so that the mat 6 is correspondingly cooled to a temperature not higher than a temperature for interrupting the reaction of the reactive kneaded material 7, thereby forming an SMC 15. Next, the SMC 15 is sent onto a sheet cutter 16 to be cut into pieces having a predetermined length.

Referring still to FIG. 1, a press molding machine 17 has upper and lower metal molds 18a and 18b attached thereto. In the press molding machine, the cut pieces of SMC 15 are heated and pressed into a desired shape and hardened at a high temperature to thereby produce fiber reinforced plastic moldings.

In this embodiment, if a sheet die is used as the die, it is possible to extrude the reactive kneaded material to form like a sheet and laminate the sheet material onto the long-fiber mat 6.

Although it is preferable to use a polyethylene film as each of the thin adhesion preventing plastic films 13 and 14, a polypropylene film or the like may be used. Further, as the thermosetting resin component, not only un-saturated polyester resin but phenol resin or the like may be used, and as the thermoplastic resin component, not only cross-linked acrylonitrile buladien rubber (NBR) but a methacrylate butadien styrene copolymer (MBS) or the like may be used.

EXAMPLE 1

An intermeshing twin screw extruder having a screw diameter of 44 mm and a length 39 times the screw diameter was provided. The twin screw extruder had three supply inlets. The thermosetting resin component for forming a matrix sea phase, such as unsaturated alkyd, and the thermoplastic component for forming an island phase to act as a tough material, such as powderd, partially cross-linked NBR which is obtained by emulsion polymerization, were supplied through a first supply inlet from their corresponding auxiliary supply devices, respectively. Then, the NBR and the unsaturated alkyd were sufficiently kneaded to each other at a temperature not higher than the cylinder temperature of 110° C. in the twin screw extruder. A liquid bi-functional oligomer was supplied from a second supply inlet by a plunger pump, and sufficiently kneaded at a temperature not higher than the cylinder temperature of 100° C. Thereafter, a peroxide catalyst dissolved in a bifunctional oligomer was applied through a third supply inlet, and sufficiently kneaded at a temperature not higher than the cylinder temperature of 95° C. The rotational speed of the screw was 100 rpm, the rate of extrusion was 15 kg/hr, and the temperature of the reactive kneaded material discharged from the die was 105° C.

A long-fiber mat coated with the discharged reactive kneaded material was pressed by a press machine while being cooled so as to cause impregnation to thereby produce an SMC. The SMC was shaped by upper and lower metal molds attached on a vertical stamping press molding machine, and hardened at a high temperature, so that fiber reinforced plastic moldings were produced. In this case, the metal mold temperature was 160° C. and the curing time was 10 minutes.

Table 1 shows results of measurements of the mechanical characteristics of the fiber reinforced plastic moldings obtained as described above.

TABLE 1

| Matrix Material | GF Content (%) | Bending strength (kgf/cm$^2$) | Bending elastic modulus (kgf/cm$^2$) | Izod impact strength (kgf·cm/cm) | Heat deflection Temperature (°C.) |
| --- | --- | --- | --- | --- | --- |
| Unsaturated polyester + NBR | about 40 long-fiber random mat | 1400 | 53000 | (no notch) 90 | 250 or more |

EXAMPLE 2

An intermeshing twin screw extruder having an screw diameter of 44 mm and a screw length 39 times as long as the screw diameter was used as the twin screw extruder. The twin screw extruder had three supply inlets. The thermosetting resin component for forming a matrix sea phase, such as unsaturated alkyd, and the thermoplastic component for forming an island phase to act as a tough material, such as powered, partially cross-linked NBR which is obtained by emulsion polymerization, were supplied through a first supply inlet from their corresponding auxiliary supply devices, respectively. Thereafter, the NBR and the unsaturated alkyd were sufficiently kneaded to each other at a temperature not higher than the cylinder temperature of 110° C. in the twin screw extruder. Next, a liquid bi-functional oligomer or a styrene monomer was supplied from a second supply inlet by a plunger pump, and was sufficiently kneaded at a temperature not higher than the cylinder temperature of 95° C. The rotational speed of the screw was 100 rpm, the rate of extrusion was 15 kg/hr, and the temperature of the reactive kneaded material discharged from the die was 105° C.

The discharged reactive kneaded material was supplied onto two, five, and ten long-fiber mats, and the mats were pressed by a press machine while being cooled so as to be impregnated with the reactive kneaded material to thereby produce SMC. The SMC were shaped by upper and lower metal molds attached on a vertical stamping press molding machine, and cured at a high temperature, thereby producing fiber reinforced plastic moldings. In this case, the metal mold temperature was 160° C., and the curing time was ten minutes.

The physical properties of the moldings in which a liquid bi-functional oligomer and a styrene monomer were compounded were measured, and comparative evaluation was made on the measurement results.

Figure 4:
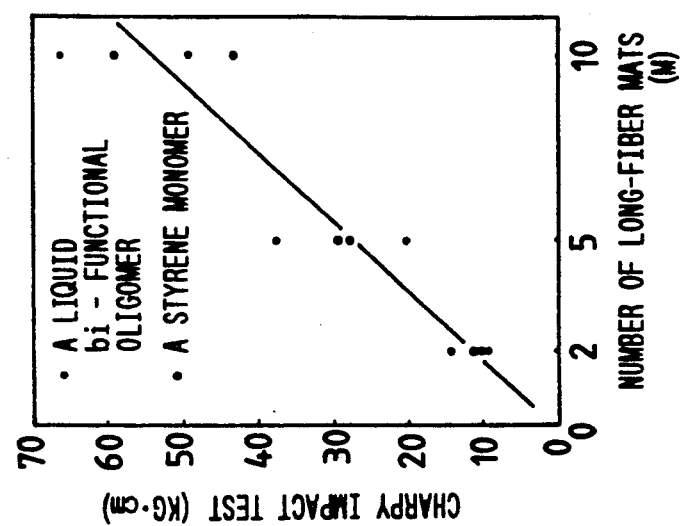
FIGS. 2, 3 and 4 are diagrams showing the physical properties of fiber reinforced plastic moldings produced by the method according to the present invention, FIG. 2 being a graph showing the relationship between the bending strength and the number of long-fiber mats, FIG. 3 being a graph showing the relationship between the bending elastic modulus and the number of long-fiber mats, and FIG. 4 being a graph showing the relationship between the Charpy impact test and the number of long-fiber mats.
Figure 3:
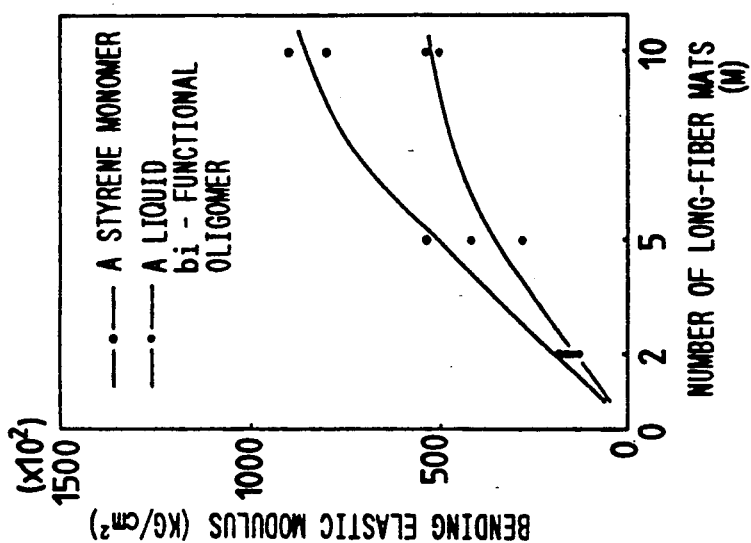
Figure 2:
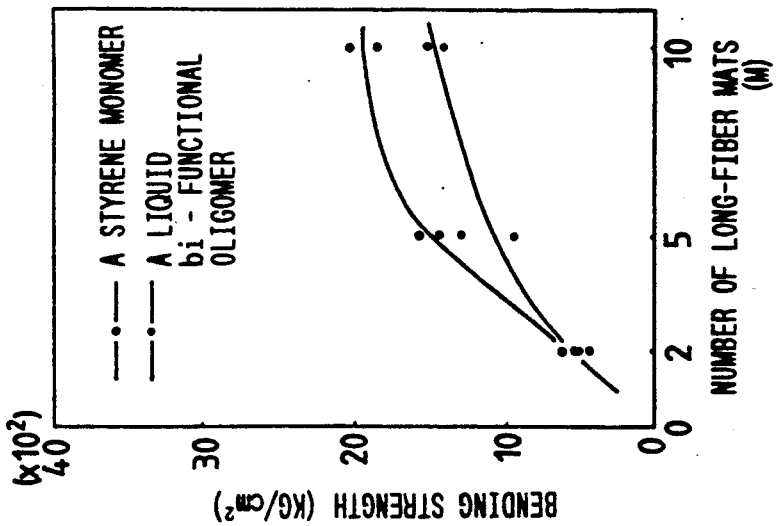
Figure 5:
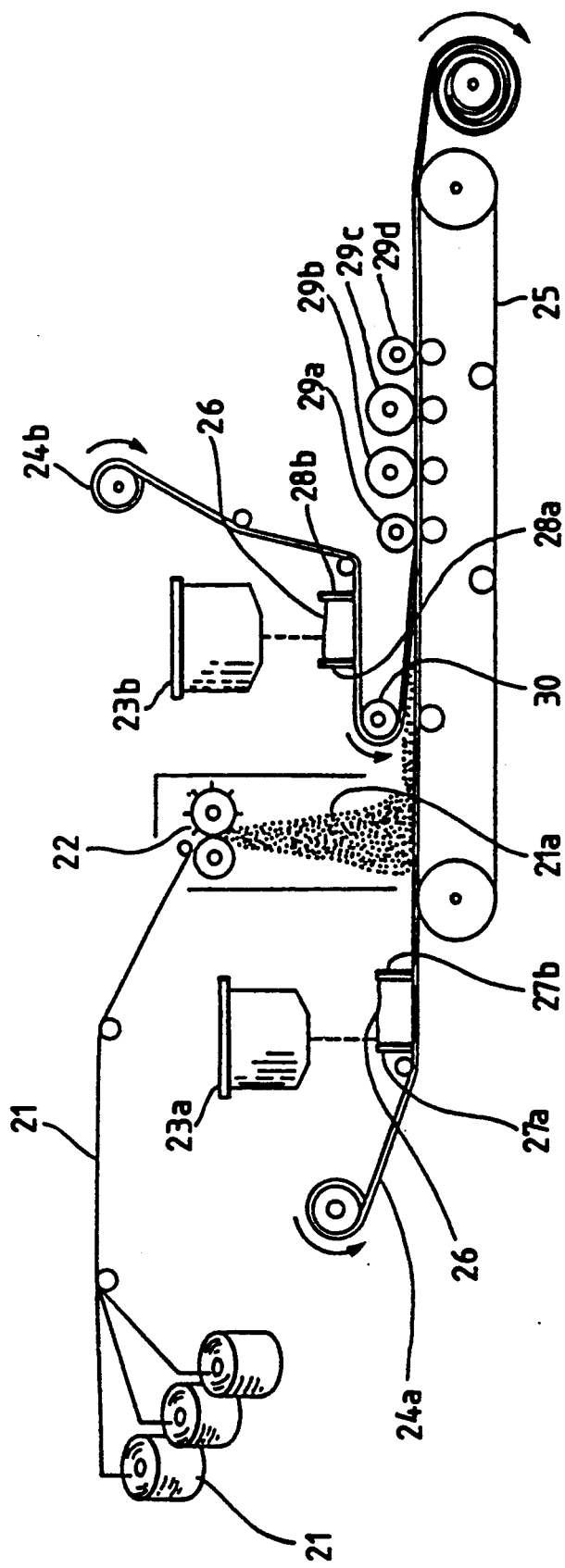
FIGS. 5, 6 and 7 illustrate conventional methods of producing fiber reinforced plastic moldings.
Figure 6:
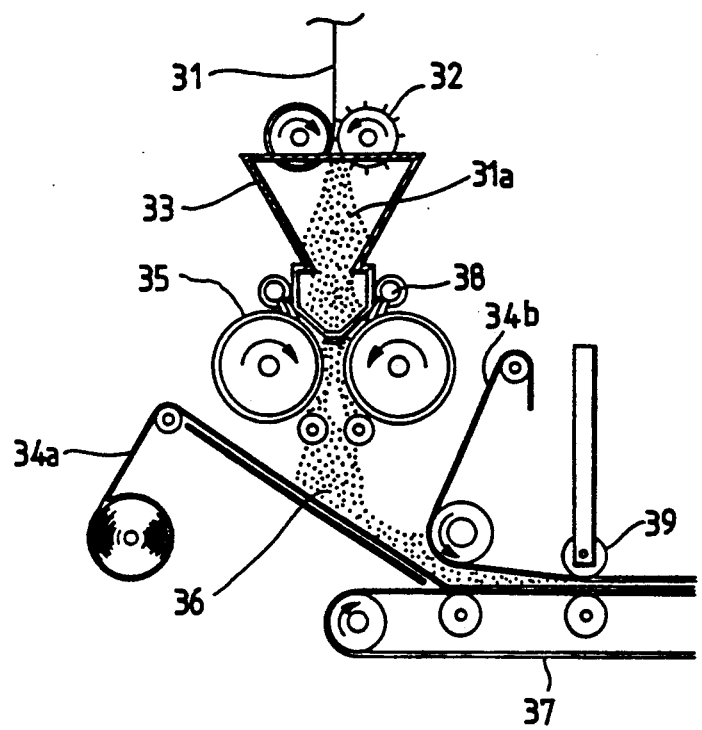
Figure 7:
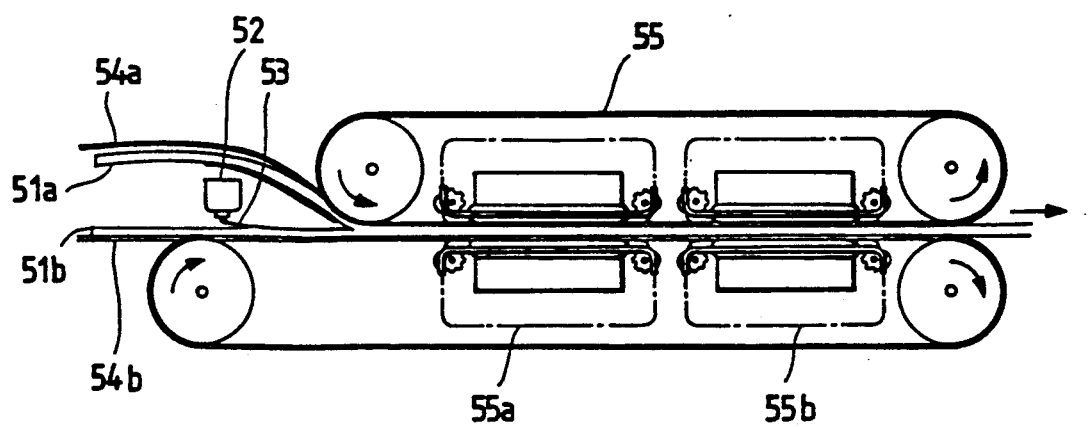

FIG. 2 shows the relationship between the bending strength and the number of the long-glass fiber mats, FIG. 3 shows the relationship between the bending elastic modulus and the number of the long-fiber mats, and FIG. 4 shows the relationship between the Charpy impact strength and the number of the long-fiber mats.

As seen from FIG. 2 through FIG. 4, the more the number of the long-fiber mats increased, the more the strength increased. Additionally, the moldings in which a styrene monomer was compounded has a greater bending strength in comparison with the moldings in which a bi-functional oligomer was compounded.

EXAMPLE 3

The heat deflection temperatures (hereinafter, referred to as an HDT) of fiber reinforced plastic moldings produced in the same manner as in the case of the Example 2 were measured. Table 2 shows the measurement results.

TABLE 2

| Mixed monomer | Number of mats | HDT (°C.) |
| --- | --- | --- |
| Styrene Monomer | 2 | 120.5 |
| ↑ | 5 | 250 or more |
| ↑ | 10 | 250 or more |
| Bi-functional oligomer | 2 | 75.0 |
| ↑ | 5 | 250 or more |
| ↑ | 10 | 250 or more |

By kneading using a twin screw extruder, fine particles of a thermoplastic resin component are micro-dispersed in the form of island in a thermosetting resin component in the form of a matrix. Therefore, a reactive kneaded material having low viscosity can be generated at a low temperature, and a long-fiber mat can be sufficiently impregnated with the reactive kneaded material. Further, for example, non-compatible resin materials or resin materials substantially different in viscosity can be sufficiently kneaded to each other, and therefore reactive kneaded materials of various compositions can be produced.

Moreover, since it is possible to continuously discharge a reactive kneaded material from the die and to apply the reactive kneaded material onto a long-fiber mat, fiber reinforced plastic moldings which are superior in rigidity and impact resistance can be produced with high productivity.

We claim:

1. A method of producing fiber reinforced plastic moldings comprising the steps of;
   supplying a thermosetting resin component and a thermoplastic resin component into an extruder;
   kneading said thermosetting resin component and said thermoplastic resin component into each other in said extruder so as to produce a fused material in which fine particles of said thermoplastic resin component are dispersed in said thermosetting resin component;

supplying a liquid monomer into said extruder so that said liquid monomer is mixed with said fused material so as to reduce the viscosity of said fused material;

supplying a reaction initiator into said extruder so that said reactive initiator is mixed with said fused material at a temperature not higher than a reaction initiation temperature so as to produce a reactive kneaded material;

continuously discharging said reactive kneaded material from a die of said extruder so as to apply said reactive kneaded material onto a long fiber mat;

pressing and cooling said long-fiber mat coated with said reactive kneaded material to shape said long-fiber mat into a sheet;

cutting said sheet of long-fiber mat into pieces having a predetermined length;

shaping the thus cut pieces into moldings of a desired form by means of a press molding machine; and heating said moldings at a high temperature so as to harden said moldings.

2. The method of claim 1 wherein said steps of pressing and cooling said mat are conducted simultaneously.

3. The method of claim 1 wherein said pressing step includes providing a plurality of rollers disposed on opposite side of said mat and providing an adhesion preventing film between said mat and said rollers.

4. The method of claim 1 wherein said long-fiber mat is made of glass fiber.

5. The method of claim 1 wherein said thermosetting resin component is selected from one of a group of materials consisting of a unsaturated polyester resin and a phenol resin.

6. The method of claim 1 wherein said thermoplastic resin component is selected from a group consisting of cross-linked acrylonitrile butadiene rubber and methacrylate butadiene styrene copolymer.

* * * * *